UNITED STATES PATENT OFFICE.

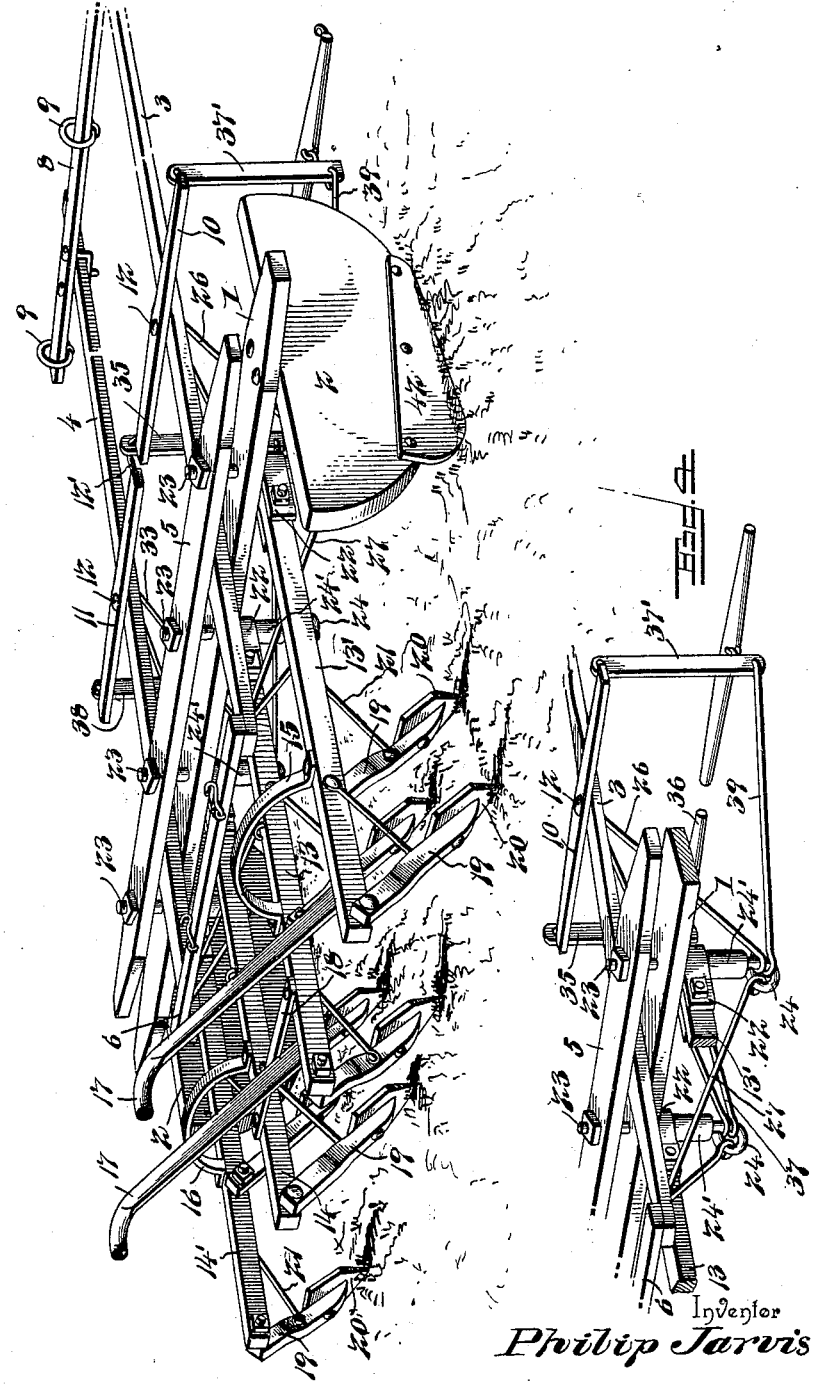

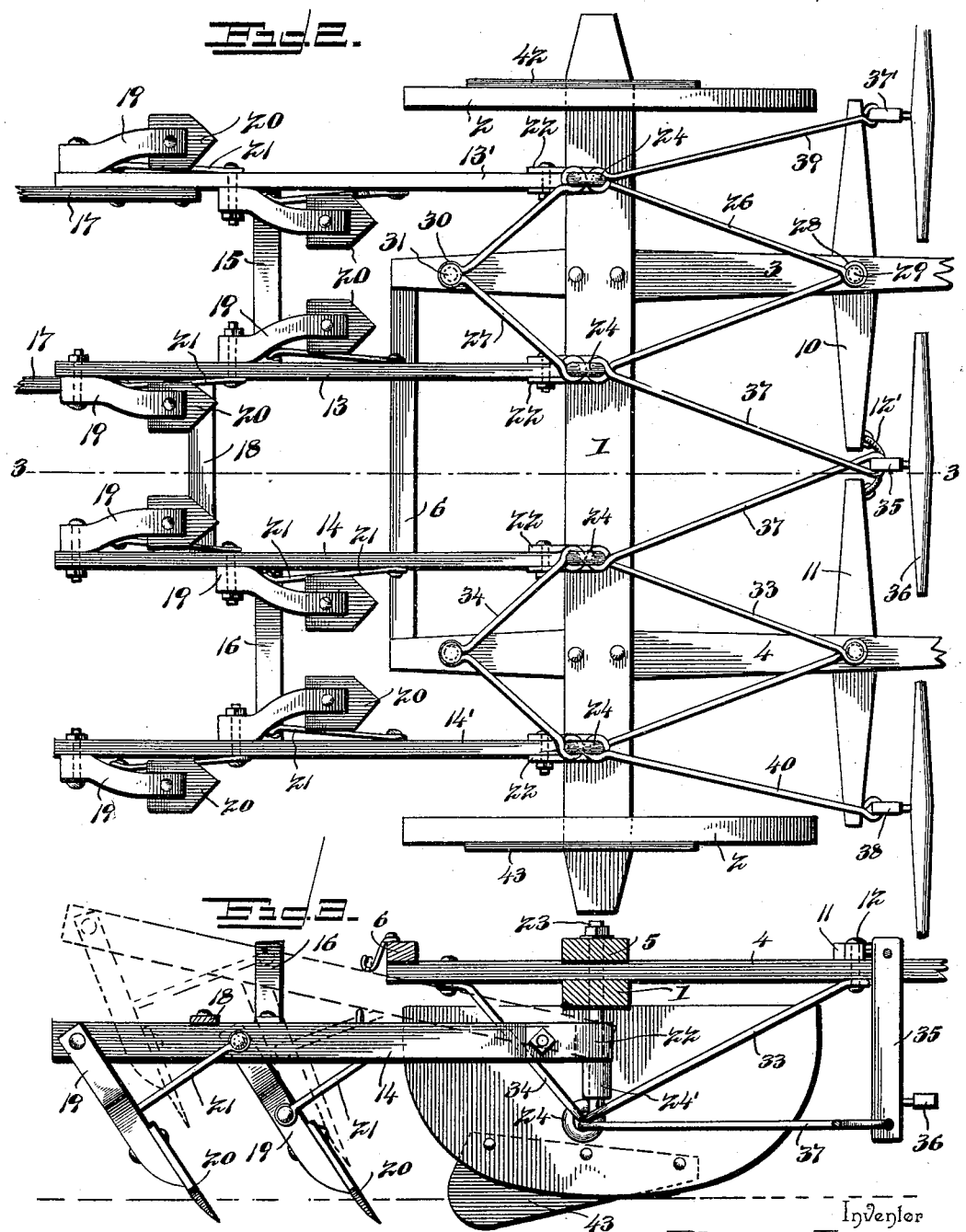

PHILIP JARVIS, OF CEDAR RAPIDS, NEBRASKA.

CORN-CULTIVATOR.

SPECIFICATION forming part of Letters Patent No. 594,254, dated November 23, 1897.

Application filed July 8, 1897. Serial No. 643,869. (No model.)

*To all whom it may concern:*

Be it known that I, PHILIP JARVIS, a citizen of the United States, residing at Cedar Rapids, in the county of Boone and State of Nebraska, have invented a new and useful Corn-Cultivator, of which the following is a specification.

My invention relates to improvements in corn-cultivators, in which I employ a gang of plows which may be adjusted by the driver laterally with relation to the rows of growing corn either to the right or to the left, as desired; and the objects of my invention are, first, to provide an improved draft appliance in which the draft of the three horses hitched to the implement is kept low to the ground; secondly, to provide means which prevent lateral or sidewise displacement of the implement, so as to cause it to run straight and true and to cut the stalks in the path of the runners of the machine, and, finally, to provide a simple and durable construction of parts which are not liable to get out of order.

To the accomplishment of these ends, my invention consists in the novel combination of elements and in the construction and arrangement of parts, which will be hereinafter fully described and claimed.

To enable others to understand my invention, I have illustrated the preferred embodiment of the same in the accompanying drawings, forming a part of this specification, and in which—

Figure 1 is a perspective view of a corn-cultivator constructed in accordance with my invention. Fig. 2 is an inverted or bottom plan view of the same. Fig. 3 is a longitudinal sectional elevation on the plane indicated by the dotted line 3 3 of Fig. 2. Fig. 4 is a detail perspective view of the braces for one pair or gang of the plow-beams.

Like numerals of reference denote corresponding parts in all the figures of the drawings, referring to which—

1 designates the main transverse beam of my improved implement. This beam 1 is fastened or secured rigidly to the runners 2 2, which are arranged in parallel relation to each other, near the ends of the main beam 1, the beam and runner being united together in any suitable manner. In my improved implement I design to employ three horses to draw the implement across the field, and I employ the two tongues 3 4, which are secured rigidly near their rear ends to the transverse beam 1. These tongues are braced where they are attached to the main beam 1 by means of the cross-bar 5, which is placed on top of the tongues and suitably fastened to the beam 1, and the rear extremities of the tongues are extended behind the main beam 1 for suitable distances, said rear extremities of the tongues being joined together by a cross-bar 6, suitably fastened to the tongues. The tongues are spaced apart for a suitable distance and their front ends are coupled together by means of the neck-yoke 8, suitably attached to the tongues and provided with the three loops or rings 9, to which the hames of the three draft-horses may be hitched in any suitable way. On the rear part of the draft-tongues in advance of the main transverse beam 1 of the implement is mounted the doubletrees 10 11, which are attached pivotally and centrally, as at 12, to the draft-tongues, and the inner ends of the doubletrees are loosely connected together, as by a chain 13 or other flexible connection.

I have provided two pairs of beams, (indicated at 13 13' and 14 14'.) The cultivator-beams are pivoted independently to the main transverse beam, but the beams 13 13' are coupled together by the yoke 15 to constitute one pair of beams, while the other beams 14 14' are coupled together by the yoke 16 to constitute the other pair of beams. The beams 13 13' are provided with handles 17, by which the implement may be guided, and the other pair of beams 14 14' are connected by the coupling-bar 18 to the pair of beams 13 13', whereby the entire gang of beams and the teeth carried thereby may be controlled and adjusted by the driver having hold of the handles 17 of the implement. Each beam of the gang of beams carries a pendent stock or foot 19, provided with the point or shovel 20, and the stock or foot and the beam are braced by the stay-rods 21, suitably attached to the respective parts.

Each beam is provided at its front end with a clip 22, forming an eye by which the beam may be pivotally or loosely connected to a standard or pivotal rod 23, attached securely to the main transverse beam 1 of the implement. There are a series of these standards 23 provided for the gang of cultivator-beams, one for each beam, and said standards are suitably spaced apart to hold the beams in their proper relation to each other and to the main beam. Each standard 23 is rigidly secured to the main beam 1 in a suitable way, and at the lower end of the standard is provided an eye 24, to which are connected the braces, presently described. The clip 22 of the cultivator-beam is fitted loosely on the standard between the eye 24 thereof and the beam 1, and the beams are prevented from having vertical play or displacement on the standard by means of the spacing collar or sleeve 24', which is loosely fitted on the lower part of the standard to rest upon the eye 24 thereof and to bear against the lower edge of the clip 22 to prevent the latter from slipping downward on the standard. The standards 23 of the pair of beams 13 13' are braced by the stay-rods 26 27, the stay-rod 26 being bent to provide a central eye 28, which is fastened at 29 to the one of the tongues in advance of the main beam, while the rear extremities of the said rod 26 are connected to the eyes 24 of the two standards to which the beams 13 13' are attached. The other stay-rod 27 is bent at its middle to provide the central eye 30, fastened at 31 to the tongue in rear of the main beam 1, and the extremities of said stay-rod 27 are also attached to the eyes 24 of the pair of standards to which the beams 13 13' are pivoted. The standards 23 of the other pair of beams 14 14' are braced in like manner by the stay-rods 33 34, constructed and attached to the other tongue and to the said standards in a manner similar to the stay-rods 26 27 for the standards of the beams 13 13', as will be readily understood by reference to Figs. 2 and 3.

To the flexible connection 13, between the doubletrees 10 11, is loosely connected the upper end of a vertical draft-bar 35, which is disposed centrally between the tongues of the implement, and to this draft-bar is connected a singletree 36. The lower end of the draft-bar is stayed by means of the divergent rods 37, which extend rearwardly and are connected to the eyes 24 of the two middle standards on the main beam 1. Similar draft-bars 37 38 are connected to the extremities of the doubletrees 10 11, and the lower ends of these outside draft-bars are provided with the stay-rods 39 40, which are attached to the outside standards on the transverse beam 1. These outside draft-bars 37 38 are provided with whiffletrees, to which the two outside draft-horses are attached.

The runners 2 2 of the implement are provided with the blades 42 43, which are rigidly fastened thereto, as by bolts. These blades project below the edges of the runners for a suitable distance, and they have inclined or curved edges, which are beveled or sharpened to enable the blades to penetrate the ground. These projecting blades serve to prevent lateral or sidewise displacement of the implement, so as to cause it to run true and straight, and they also cut any stalks which may lie in their path.

From the foregoing description, taken in connection with the drawings, it will be seen that I have provided an improved implement of simple construction in which the draft appliances are arranged to keep the draft low down or close to the ground and that the cultivator-beams are connected to the main transverse beam and to each other to enable the gang of beams and teeth to be adjusted and controlled readily by the driver.

Various slight changes in the form and proportion of parts and in the details of construction may be made without departing from the spirit or sacrificing the advantages of my invention.

Having thus fully described my invention, what I claim as new, and desire to secure by Letters Patent, is—

1. In a corn-cultivator, the combination with a transverse main beam, the plow-beams attached thereto for lateral adjustment, and a draft appliance, of the runners fastened to the ends of the transverse beam, and the guide and cutter plates attached rigidly to the runners and projecting below the edges thereof, for the purposes described, substantially as set forth.

2. In a corn-cultivator, the combination with a transverse main beam, and the draft-tongues, of the standards rigidly attached to the transverse beam, the cultivator-beams pivoted to the standards, the doubletrees pivoted to the tongues, the draft-bars carrying the whiffletrees and linked to the standards, and braces for said standards, as and for the purposes described.

3. In a corn-cultivator, the combination with a main transverse beam, and the draft-tongues, of the cultivator-beams loosely fitted on the standards, the spacing sleeves or collars on the standards to hold the beams from vertical play thereon, the vertical draft-bars, the doubletrees, the links connecting said draft-bars with the standards, and the braces attached to the standards and to the draft-tongues, as and for the purposes described.

In testimony that I claim the foregoing as my own I have hereto affixed my signature in the presence of two witnesses.

PHILIP JARVIS.

Witnesses:
L. J. TRAYNOR,
W. H. KELLY.